UNITED STATES PATENT OFFICE.

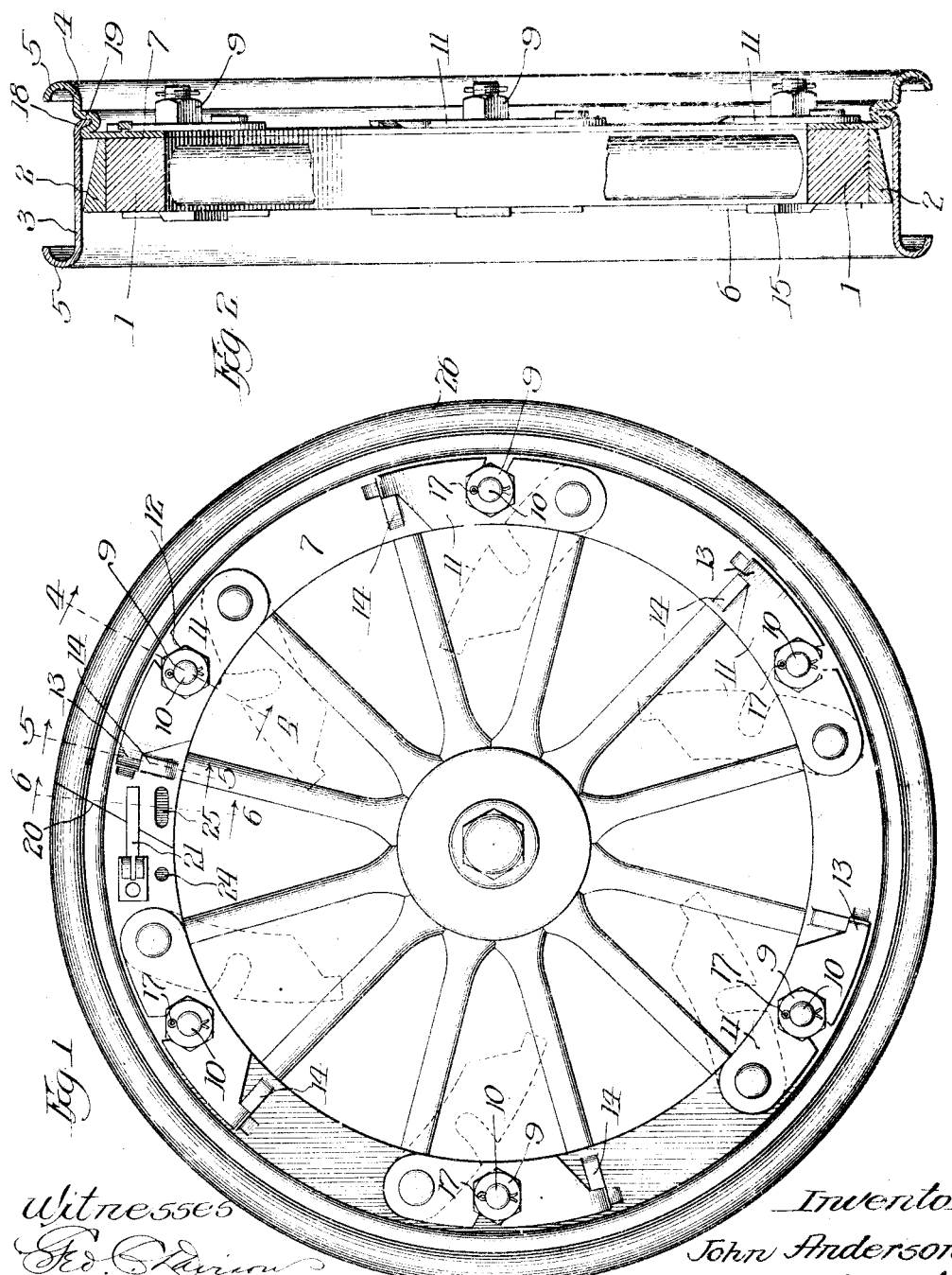

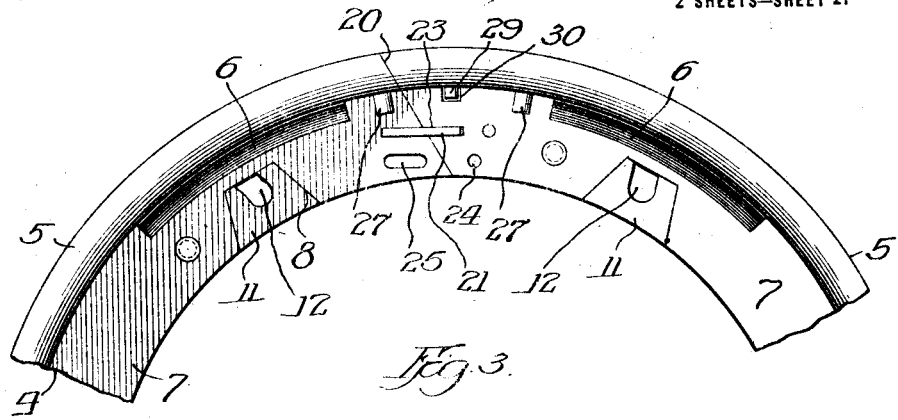
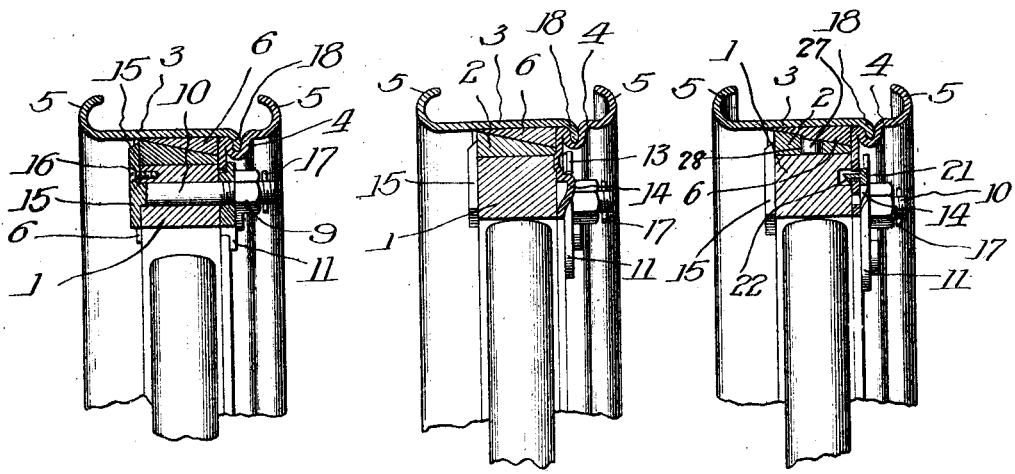

JOHN ANDERSON, OF CHICAGO, ILLINOIS.

AUTOMOBILE-WHEEL.

1,141,516.    Specification of Letters Patent.    Patented June 1, 1915.

Application filed July 9, 1912. Serial No. 708,470.

*To all whom it may concern:*

Be it known that I, JOHN ANDERSON, citizen of the United States, residing at Chicago, in the county of Cook and State of Illinois, have invented a certain new and useful Improvement in Automobile-Wheels, of which the following is a full, clear, concise, and exact description.

My invention relates to an automobile wheel, and its object is to provide a wheel of simple construction in which the wheel rim can be quickly and easily demounted from the felly and the two sections of the rim be then detached the one from the other for the purpose of removing one tire from the rim and substituting another therefor.

My invention presents features of novelty with respect to both the felly and the rim, and more particularly to the latter.

One feature of my invention relates to the means whereby the wheel rim is demountably secured to the felly.

Another feature of my invention relates to the structure of the wheel rim and the means whereby the two sections thereof are detachably secured together.

These and various other features of my invention may be more readily understood by reference to the accompanying drawings, in which—

Figure 1 is a front elevation of a wheel embodying my invention; Fig. 2 is a diametrical section thereof; Fig. 3 is an inside front elevation of a portion of the wheel rim; Figs. 4, 5 and 6 are sections on the lines 4—4, 5—5 and 6—6, respectively.

Similar letters of reference refer to similar parts throughout the several views.

The periphery of the wheel, which receives the wheel rim, is tapered from its inner toward its outer edge, such taper being preferably obtained by providing the wooden portions of the felly 1 with a tapering metallic felly-band 2.

The wheel rim is composed of two sections 3, 4 provided with peripheral side flanges 5 for gripping the tire. These flanges may be of any desired construction, those for use with a well-known clencher type of tire being shown in the drawings.

The under side of the wheel rim is provided with inwardly tapering wedge-shaped segments 6 adapted to be seated upon the oppositely tapering felly-band 2. The wedge-shaped segments 6 of the wheel rim may be, as shown in Fig. 3, composed of a plurality of suitably spaced apart segments, this latter structure making the wheel less heavy than when a continuous band is provided.

The rim section 4 is provided at its inner edge with a radially extending peripheral flange 7. Said flange is provided with a plurality of slots 8 of sufficient size to permit the flange 7 being passed over the clamping nuts 9 which are threaded upon the ends of bolts 10. The slots 8 preferably open upon the inner edge of the flange 7.

Pivoted upon the outer face of the flange 7 are a series of latches 11 in the form of metallic plates each provided with an upwardly opening slot 12 of a width to receive the end of a corresponding bolt 10. When the latches are in closed position, as shown in full lines in Fig. 1, the nuts 9 overlie the same and hence the rim is locked against removal from the felly.

The free end of each of the latches 11 is preferably provided with an extension 13, which, as the latch is moved to closed position, rides over a beveled lug 14. Said lug 14 may be formed as a punching from the flange 7. When the latch 11 is moved to its final position of closure, it is, by reason of the fact that the extension 13 lies beyond the outer end of the lug 14, locked against accidental release, even though the nut 9 should become loosened. The latches 11 have sufficient spring to ride over the lug 14 and to snap in place. When the latches have been thus swung to closed position, the nuts 9 are screwed down and the rim is thus securely fastened to the felly.

It will be understood that the bolts 10 extend through the wooden portion of the felly in the usual manner. In order that said bolts may be held in proper position on the felly, each bolt is preferably provided with an extended flattened head 15 which is fastened to the felly by means of a screw 16. The outer end of each bolt 10 is preferably provided with a cotter pin 17 to prevent the nut 9 from working off of the end of the bolt. The cotter pin 17 is so located that the nut 9 can be unthreaded sufficiently to release the latch 11.

Assuming that the wheel rim is secured in position, as shown in Fig. 1, it may be demounted by loosening the nuts 9 and then swinging the latches 11 to the position shown in dotted lines in Fig. 1. The wheel rim as a whole can then be removed from the felly, the slots 8 in the flange 7 permitting said flang to pass over the nuts 9.

One section of the wheel rim is provided with a tongue, and the other section thereof with a groove, which tongue and groove interlock with each other to hold the two sections together. In the drawings, the rim section 3 is shown at its inner edge with a radially extending peripheral flange 18 constituting a tongue which interlocks with an upwardly opening groove 18 formed in the rim section 4. In order that the rim sections 3 and 4 may be released from each other, one of said sections is transversely slitted. Section 4 is preferably the one which is so slitted, the slit therein being indicated at 20. Normally the two ends of the slitted section 4 are secured together by a latch 21 which is pivotally mounted at one side of the slit 20, and is provided on its inner face with a flange 22 which extends into an alined slot 23 in the abutting ends of the flange 7.

After the rim has been demounted from the felly, the rim sections may be taken apart by first throwing open the latch 21 and then forcing one end of the rim section 4 inwardly to withdraw the groove 19 from the tongue 18. In order to facilitate this operation, there is provided upon one side of the slit 20 a hole 24 and upon the other side a slot 25. By using an ordinary spanner wrench, or similar device, one member of which enters the hole 24 and the other member the slot 25, and turning said wrench about the hole 24, the section 4 may readily be drawn inward and released from the tongue 18. The tire 26 may thus readily be removed from the wheel rim and a new tire substituted therefor, after which the rim sections are locked together, as shown in the drawings, and the wheel rim then secured in place upon the felly, as likewise shown in the drawings.

As a guide to the proper alinement of the wheel rim with respect to the felly, I preferably provide on the under face of the rim two pins 27 which fit in holes 28 in the felly-band 2. Likewise there may be provided on the underside of the rim section 3 a pin 29 which fits in a notch 30 in the flange 7 of the other rim section 4.

My invention provides a wheel of such construction that with ordinary tools, or even without the use of tools, a tire may be removed from the wheel and another tire substituted therefor with ease and expedition.

What I claim is:

1. In an automobile wheel, the combination with a felly, of a detachable rim having a peripheral flange on its under face adapted to fit the front side of said felly, bolts projecting from the front side of said felly, said flange being slotted to slip over said bolts, and latches pivoted to said flange and arranged to swing into locking engagement with said bolts.

2. In an automobile wheel, the combination with a felly, of a detachable rim having a radially extending peripheral flange extending from near the front edge of the under surface of said rim, bolts carried by said felly and projecting through the front face thereof, nuts upon the ends of said bolts, said flange being slotted to slip over said bolts, and latches corresponding to said bolts, said latches each consisting of a metallic plate pivoted upon said flange at one side of the corresponding slot and provided with a slot for receiving the bolt, whereby said latches are adapted to swing into locking engagement beneath said nuts.

3. In an automobile wheel, the combination with a felly provided with a felly-band of wedge-shaped cross-section tapering toward the front side of said felly; of a demountable wheel rim having an under surface tapered in a direction opposite to the taper of said felly-band and adapted to fit thereover; bolts projecting from the front side of said felly; and latches pivoted to said wheel rim and arranged to swing into locking engagement with said bolts.

In witness whereof, I hereunto subscribe my name this sixth day of July A. D., 1912.

JOHN ANDERSON.

Witnesses:
 ALFRED H. MOORE,
 GEORGE E. FOLK.